(12) United States Patent
Afrasiabi et al.

(10) Patent No.: US 12,045,930 B2
(45) Date of Patent: Jul. 23, 2024

(54) COMPUTING DEVICE AND METHOD FOR GENERATING REALISTIC SYNTHETIC IMAGE DATA

(71) Applicant: THE BOEING COMPANY, Chicago, IL (US)

(72) Inventors: Amir Afrasiabi, University Place, WA (US); Nick Shadbeh Evans, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 120 days.

(21) Appl. No.: 17/689,156

(22) Filed: Mar. 8, 2022

(65) Prior Publication Data

US 2022/0335679 A1 Oct. 20, 2022

Related U.S. Application Data

(60) Provisional application No. 63/175,225, filed on Apr. 15, 2021.

(51) Int. Cl.
*G06T 15/10* (2011.01)
*G06F 18/214* (2023.01)
(Continued)

(52) U.S. Cl.
CPC .......... *G06T 15/10* (2013.01); *G06F 18/2155* (2023.01); *G06N 20/00* (2019.01); *G06T 15/50* (2013.01)

(58) Field of Classification Search
CPC ......... G06T 15/10; G06T 15/50; G06T 17/00; G06T 19/20; G06T 2207/10028;
(Continued)

(56) References Cited

U.S. PATENT DOCUMENTS 9,665,800 B1 * 5/2017 Kuffner, Jr. .......... G06V 20/647
10,692,000 B2 * 6/2020 Surazhsky ............... G06N 3/08
(Continued)

FOREIGN PATENT DOCUMENTS

EP 3 792 827 A1 3/2021

OTHER PUBLICATIONS

EP Application No. 22163745.7, extended EP Search Report mailed Sep. 2, 2022.

*Primary Examiner* — Xilin Guo
(74) *Attorney, Agent, or Firm* — Alston & Bird LLP (57) ABSTRACT

A computing device, a method and a computer program product are provided to generate realistic synthetic image data that is utilized to train, test and/or deploy a computer vision model, such as to recognize an object from an image, to identify a visual anomaly in the object from an image of the object or the like. In the context of a method, a plurality of computer generated three-dimensional (3D) models of an object are generated. The method also generates realistic synthetic image data representative of each of the plurality of computer generated 3D models. The realistic synthetic image data is generated by utilizing a first machine learning model trained with pairs of computer generated synthetic image data and real image data of the object. The method further trains, tests or deploys the computer vision model to recognize the object from an image based upon the realistic synthetic image data.

20 Claims, 8 Drawing Sheets

(51) Int. Cl.
*G06N 20/00* (2019.01)
*G06T 15/50* (2011.01)

(58) Field of Classification Search
CPC ....... G06T 7/70; G06T 2200/08; G06T 19/00; G06T 17/05; G06T 19/003; G06T 15/20; G06T 2200/24; G06T 15/00; G06F 18/2155; G06F 3/04815; G06F 3/0346; G06N 20/00; G06V 20/64; G06V 10/751; G06V 10/44; G06V 20/653
See application file for complete search history.

(56) References Cited

U.S. PATENT DOCUMENTS

| | | | |
|---|---|---|---|
| 11,288,789 B1* | 3/2022 | Chen | G06T 7/001 |
| 2016/0325851 A1* | 11/2016 | Turner | G05B 19/41805 |
| 2020/0058161 A1 | 2/2020 | ReMine et al. | |
| 2020/0211220 A1* | 7/2020 | Ilic | G06F 18/214 |
| 2020/0388017 A1 | 12/2020 | Coffman | |
| 2021/0390674 A1 | 12/2021 | Afrasiabi et al. | |

* cited by examiner

COMPUTING DEVICE AND METHOD FOR GENERATING REALISTIC SYNTHETIC IMAGE DATA

CROSS-REFERENCE TO RELATED APPLICATIONS

This application claims benefit of U.S. Provisional Application No. 63/175,225, filed Apr. 15, 2021, the entire contents of which are incorporated herein by reference.

TECHNOLOGICAL FIELD

An example embodiment relates generally to the generation of realistic synthetic image data and, more particularly, to the generation of realistic synthetic image data based upon computer generated models of an object. The realistic synthetic image data may be in conjunction with a computer vision application, such as for training, testing and/or deployment of a computer vision application.

BACKGROUND

In a variety of different applications, an object is to be detected from within an image, such as a still image, a video, or the like. For example, during a manufacturing process, an object that is being manufactured may be identified and tracked throughout the manufacturing process based upon a review of images captured at different points in time throughout the manufacturing process. The identification of the object from an image may be performed manually by a technician reviewing one or more images and identifying the object within the respective images. However, reliance upon manual review and identification of an object from one or more images may be time consuming and inefficient, particularly in instances in which a substantial number of images of which the object is only a small portion must be reviewed.

In an effort to more efficiently identify object within images, automated techniques have been developed to perform the object detection. For example, machine learning models have been developed in order to identify an object within an image. In order to consistently and accurately identify an object within an image, the machine learning model must be appropriately trained. In this regard, the machine learning model may be trained by having the machine learning model review a plurality of images and attempt to identify the object, if any, in the images. The object identified by the machine learning model is then compared to the actual location of the object, if any, within the image and feedback is provided to the machine learning model to improve its detection capabilities. As each of the images utilized for training the machine learning model must be manually reviewed to identify the object and since a machine learning model is typically trained with a substantial number of training images, the training of the machine learning model and, in particular, the construction of the plurality of training images in which the object is identified is also a time consuming process, thereby leading to inefficiencies in the generation of the machine learning model to be utilized for automated object detection.

In addition to reviewing images to identify objects, images may also be reviewed to identify a particular characteristic of the objects, such as to identify objects that have an anomaly that may merit further review or maintenance. As with the identification of the object, the review of images to identify an object having a particular characteristic may be performed manually, albeit in a process that is generally even more time consuming and less efficient due to the detailed nature of the review. While the review of the images to identify an object having a particular characteristic may also be performed in an automated fashion, the training of a machine learning model to identify an object having the particular characteristic may also be time consuming since images of the object with and without the particular characteristic must be generated and provided as training images. Moreover, in some instances in which the particular characteristic to be identified occurs infrequently, only a few training images of the object having the particular characteristic may be identified for use in training the machine learning model, thereby resulting in a machine learning model that may not perform as accurately as desired.

BRIEF SUMMARY

A computing device, a method and a computer program product are provided in accordance with an example embodiment in order to generate realistic synthetic image data that is utilized to train a machine learning model, such as to recognize an object from an image, to identify a visual anomaly in the object from an image of the object or the like. The realistic synthetic image data may be generated from computer generated models of the object and utilized as training images in order to efficiently train the machine learning model to identify the object from an image in an automated manner. Additionally, the realistic synthetic image data may be generated from computer generated models depicting the object in different positions, under different conditions, such as different lighting conditions, and/or with one or more different types of physical modifications, such as visual anomalies and/or features at least partially occluding the object. By training the machine learning model with the realistic synthetic image data that has been generated based upon computer generated models of these different representations of the object, the resulting machine learning model may identify the object from images in a more accurate and consistent manner since the machine learning model has been trained to recognize the object in different positions, under different conditions and with one or more different types of physical modifications, such as visual anomalies.

In an example embodiment, a method is provided that includes generating a plurality of computer generated three-dimensional (3D) models of an object. The plurality of computer generated 3D models represent the object in different positions or in different conditions. The method also includes generating realistic synthetic image data representative of each of the plurality of computer generated 3D models. The realistic synthetic image data is generated by utilizing a first machine learning model, such as a generative adversarial network, trained with pairs of computer generated synthetic image data and real image data of the object to transfer visual style of a first domain represented by the real image data to a second domain represented by the realistic synthetic image data. The method further includes training, testing or deploying a computer vision model to recognize the object from an image based upon the realistic synthetic image data that has been generated.

The method of an example embodiment also includes detecting the object from the image utilizing the computer vision model trained utilizing the realistic synthetic image data, such as by detecting, classifying or localizing the object within the image. Detecting the object may include transferring a localization coordinate system associated with the object that has been detected from a real image coordinate system as defined by the image to a Cartesian coordinate system. In an example embodiment, the plurality of computer generated 3D models represent the object in different lighting conditions. Additionally or alternatively, the method of an example embodiment may generate the plurality of computer generated 3D models by parametrically modifying the geometry of the 3D models to represent different configurations of the object including at least one of a physical modification of the object or a feature at least partially occluding the object. The method of an example embodiment also includes training the first machine learning model utilizing the pairs of synthetic image data and the real image data of the object in which a relative position of the object in the synthetic image data is aligned with the object in the real image data. In an example embodiment, the method also includes automatically labeling the realistic synthetic image data based upon corresponding labels of the computer generated 3D model of which the realistic synthetic image data is representative.

In another example embodiment, a computing device is provided that includes processing circuitry configured to generate a plurality of computer generated three-dimensional (3D) models of an object. The plurality of computer generated 3D models represent the object in different positions or in different conditions. The processing circuitry includes a first machine learning model, such as a generative adversarial network, configured to generate realistic synthetic image data representative of each of the plurality of computer generated 3D models. The first machine learning model is trained with pairs of computer generated synthetic image data and real image data of the object to transfer visual style of a first domain represented by the real image data to a second domain represented by the synthetic image data. The processing circuitry is further configured to train, test or deploy a computer vision model to recognize the object from an image based upon the realistic synthetic image data that has been generated.

The processing circuitry of an example embodiment is further configured to detect the object from the image utilizing the computer vision model trained utilizing the realistic synthetic image data, such as by detecting, classifying or localizing the object within the image. The processing circuitry may be configured to detect the object by transferring a localization coordinate system associated with the object that has been detected from a real image coordinate system as defined by the image to a Cartesian coordinate system. In an example embodiment, the plurality of computer generated 3D models represent the object in different lighting conditions. The processing circuitry may additionally or alternatively be configured to generate the plurality of computer generated 3D models by parametrically modifying a geometry of the 3D models to represent different combinations of the object including at least one of a physical modification of the object or a feature at least partially occluding the object. In an example embodiment, the first machine learning model is trained utilizing the pairs of synthetic image data and the real image data of the object with a relative position of the object in the synthetic image data being aligned with the object in the real image data. The processing circuitry of an example embodiment is further configured to automatically label the realistic synthetic image data based upon corresponding labels of the computer generated 3D model of which the realistic synthetic image data is representative.

In a further example embodiment, a method is provided that includes generating a plurality of computer generated three-dimensional (3D) models of an object. The plurality of computer generated 3D models represent the object having different visual anomalies. The method also includes generating realistic synthetic image data representative of each of the plurality of computer generated 3D models of the object with different visual anomalies. The realistic synthetic data is generated by utilizing a first machine learning model trained with pairs of computer generated synthetic image data and real image data of the object to transfer visual style of a first domain represented by the real image data to a second domain represented by the synthetic image data. The method further includes training, testing or deploying a computer visual model to identify a visual anomaly in the object from an image of the object based upon the realistic synthetic image data that has been generated.

The method of an example embodiment also includes detecting the visual anomaly in the object from the image of the object utilizing the computer vision model trained utilizing the realistic synthetic image data. The method may also include training the first machine learning model utilizing the pairs of synthetic image data and the real image data of the object with the relative position of the object in the synthetic image data being aligned with the object in the real image data. The plurality of computer generated 3D models may represent the object in different lighting conditions. Additionally or alternatively, the plurality of computer generated 3D models may represent the object in different positions. The method of an example embodiment may also include automatically labeling the realistic synthetic image data based upon corresponding labels of the computer generated 3D model of which the realistic synthetic image data is representative.

In yet another example embodiment, a computing device is provided that includes processing circuitry configured to generate a plurality of computer generated three-dimensional (3D) models of an object. The plurality of computer generated 3D models represent the object having different visual anomalies. The processing circuitry is also configured to generate realistic synthetic image data representative of each of the plurality of computer generated 3D models of the object with different visual anomalies. The realistic synthetic image data is generated by utilizing a first machine learning model trained with pairs of computer generated synthetic image data and real image data of the object to transfer visual style of a first domain represented by the real image data to a second domain represented by the synthetic image data. The processing circuitry is further configured to train, test or deploy a computer vision model to identify a visual anomaly in the object from an image of the object based upon the realistic synthetic image data that has been generated.

The processing circuitry of an example embodiment is also configured to detect the visual anomaly in the object from the image of the object utilizing the computer vision model trained utilizing the realistic synthetic image data. The processing circuitry may also be configured to train the first machine learning model utilizing the pairs of synthetic image data and real image data of the object with a relative position of the object in the synthetic image data being aligned with the objet in the real image data. The plurality of computer generated 3D models may represent the object in different lighting conditions. Additionally or alternatively, the plurality of computer generated 3D models may represent the object in different positions. The processing circuitry of an example embodiment may also be configured to automatically label the realistic synthetic image data based upon corresponding labels of the computer generated 3D model of which the realistic synthetic image data is representative.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A computing device, a method and a computer program product are provided in accordance with an example embodiment in order to generate realistic synthetic image data from computer generated models of an object in order to train, test and/or deploy a computer vision model to identify the object from an image. The object that is identified from the image may be any of a wide variety of objects depending upon the application in which the trained computer vision model is deployed. By way of example, but not of limitation, the computing device, method, and computer program product will be described hereinafter in conjunction with the detection of an object within an image that is captured during the process of manufacturing the object. In this regard, the object may be moved from location to location throughout a facility during the manufacturing process and images may be captured by various cameras including, for example, security cameras, within the facility with the images reviewed by the trained computer vision model to identify the object therewithin.

One type of object that may be monitored by a trained computer vision model during a manufacturing process in accordance with an example embodiment and that is provided by way of example, but not of limitation, is a fuselage section of an aircraft. In this regard, a fuselage section will be described hereinafter and will be referenced as an object that a computer vision model is trained to detect during a manufacturing process. However, the computer vision model may be trained utilizing the computing device, method, and computer program product of an example embodiment to identify other types of objects in other applications if so desired.

Figure 1:
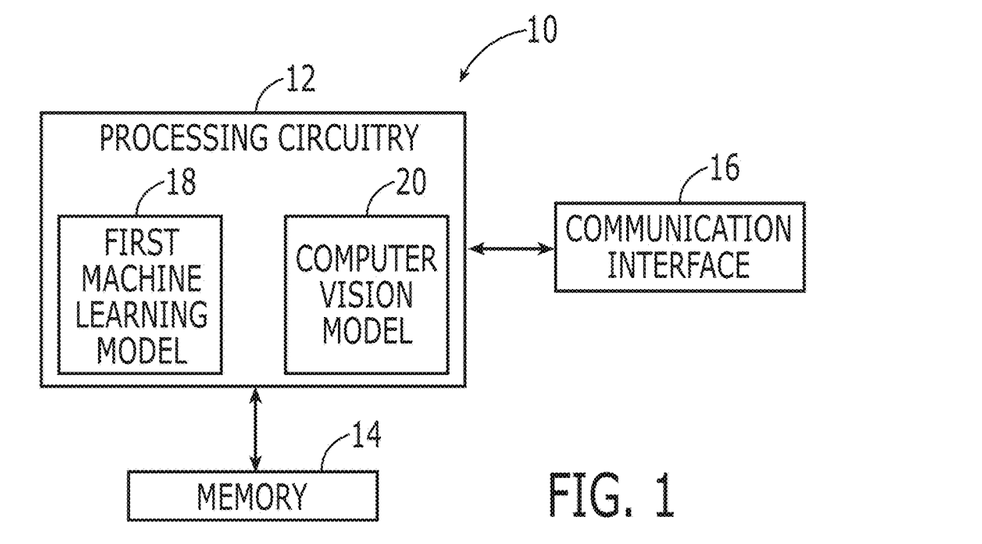
FIG. 1 is a block diagram of a computing device that may be configured to generate and utilize realistic synthetic image data, such as to train, test or deploy a computer vision model to identify an object from an image, in accordance with an example embodiment.

The computing device that is configured to generate and utilize the realistic synthetic image data, such as for training, testing and/or deploying a computer vision model to identify an object, may be embodied by any of a variety of different types of computing platforms including, for example, a server, a computer workstation, a network of distributed computing devices, a personal computer, a tablet computer, etc. Thus, the computing device does not require a specific hardware design, but any of a variety of computing platforms may be configured to operate as described herein. Regardless of the manner in which the computing device is configured, the computing device 10 of this example embodiment includes, is associated with or is otherwise in communication with processing circuitry 12 and memory device 14 as shown in FIG. 1. In some embodiments, the computing device also optionally includes, is associated with or is in communication with a communication interface 16.

In some embodiments, the processing circuitry 12 (and/or co-processors or any other processors assisting or otherwise associated with the processing circuitry) can be in communication with the memory device 14 via a bus for passing information among components of the computing device 10. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 12 can be configured to execute instructions stored in the memory device 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The computing device 10 of an example embodiment can also optionally include the communication interface 16. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Figure 2:
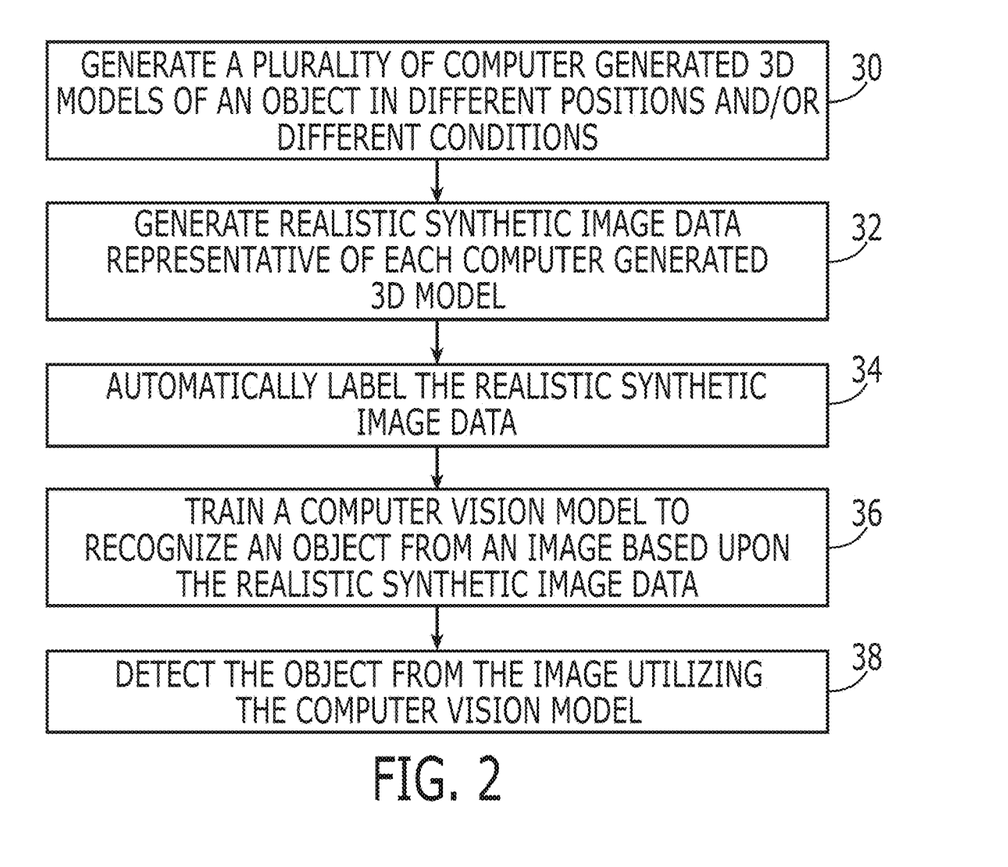
FIG. 2 is a flow chart of the operations performed, such as by the computing device of FIG. 1, to generate and utilize realistic synthetic image data, such as to train, test or deploy a computer vision model to identify an object from an image, in accordance with an example embodiment.
Figure 3:
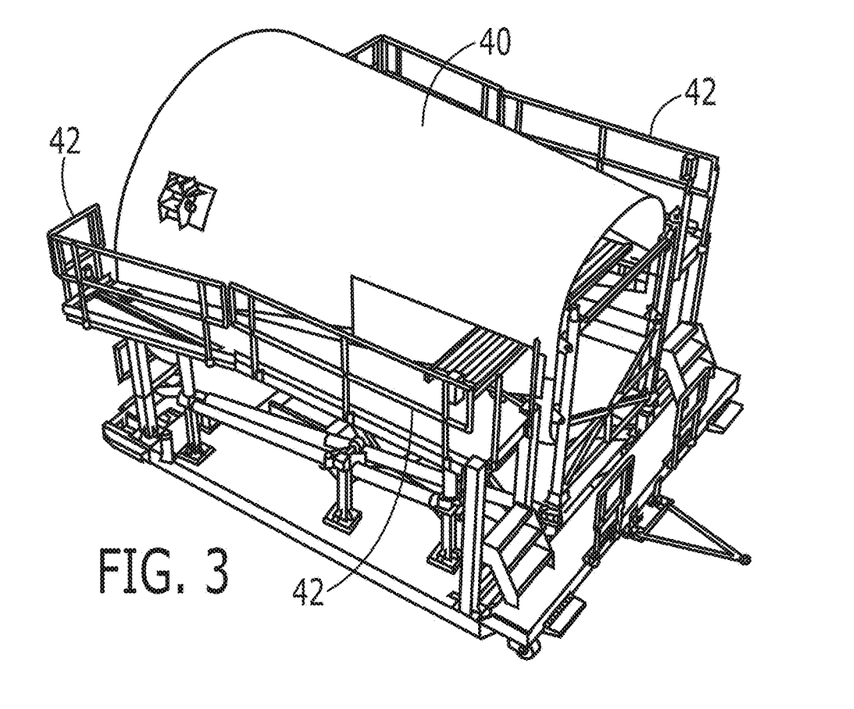
FIG. 3 is a computer generated three-dimensional (3D) model of a fuselage section.

Referring now to FIG. 2, the operations performed, such as by the computing device 10, in order to generate and utilize the realistic synthetic image data, such as to train a computer vision model to identify an object within an image, are depicted. As shown in block 30, the computing device, such as the processing circuitry 12, is configured to generate a plurality of computer generated three-dimensional (3D) models of an object. For example, the computing device, such as the processing circuitry, may be configured to generate a plurality of computer aided design (CAD) 3D models of an object. By way of example, FIG. 3 depicts the CAD model of a section 40 of the fuselage of an aircraft. In this example, the CAD model includes not only the section of the fuselage in 3D, but also scaffolding, tooling, fixtures or equipment, generally designated by 42, that may be positioned proximate the fuselage section during the manufacturing process. In an instance in which the scaffolding, tooling, fixtures or equipment is positioned in front of the fuselage section, the scaffolding, tool, fixtures, equipment or the like represent features that at least partially occlude the fuselage section. In regards to generating the 3D models of an object, the computing device of an example embodiment, such as the processing circuitry, is configured to add texture to at least some of the 3D models. Further, the computing device, such as the processing circuitry, may be configured to provide for material style transfer to the 3D object.

Figure 4A:
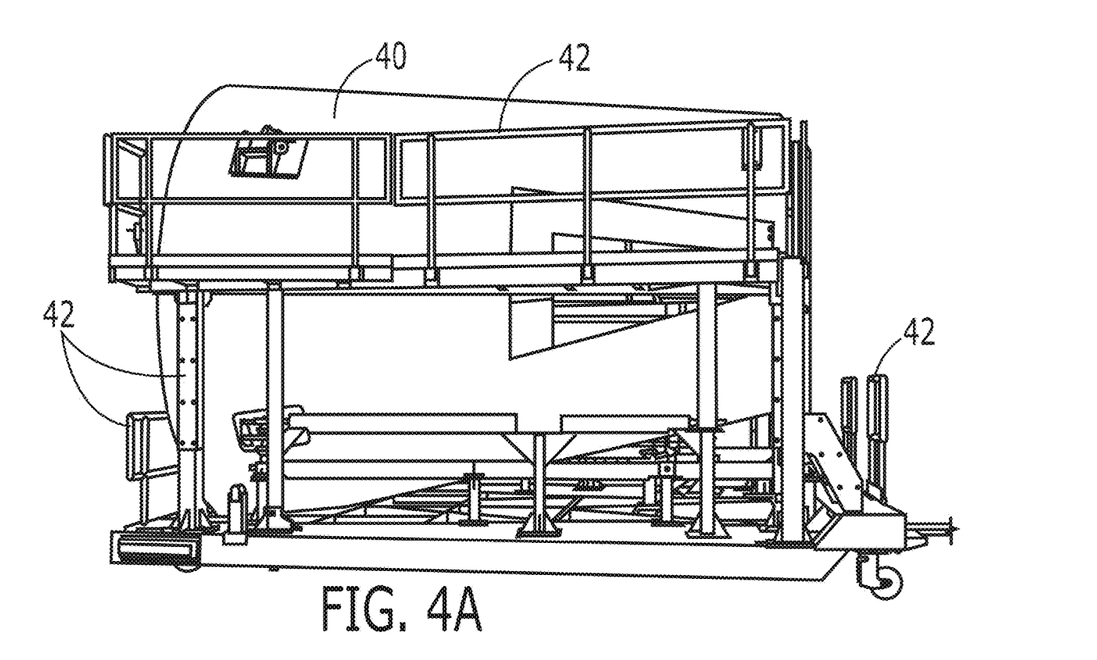
FIGS. 4A and 4B are computer generated 3D models of the fuselage section of FIG. 3 in different positions.
Figure 4B:
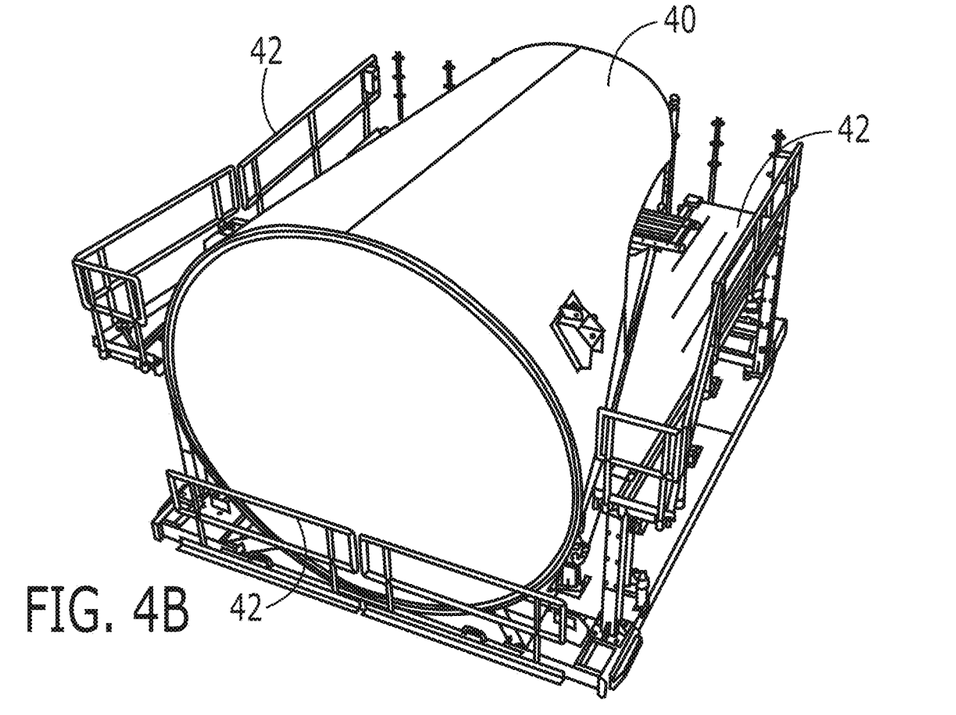

While a single CAD model of the fuselage section 40 is depicted in FIG. 3, the computing device 10, such as the processing circuitry 12, is configured to generate a plurality of computer generated 3D models of the object with those models representing the object in different positions and/or in different conditions. In this regard, the computing device, such as the processing circuitry, may be configured to parametrically modify the geometry of the 3D models to represent different configurations of the object. The different configurations of the object may include physical modifications of the object, such as the object having various visual anomalies as discussed below, and/or at least one feature at least partially occluding the object. In this regard, FIGS. 4A and 4B depict the CAD model of the fuselage section of FIG. 3 in two different positions. In FIGS. 4A and 4B, the fuselage section that is depicted by the CAD models has been rotated relative to the CAD model of FIG. 3 such that the CAD models of FIGS. 4A and 4B are of the same fuselage section but from a different perspective.

Figure 5A:
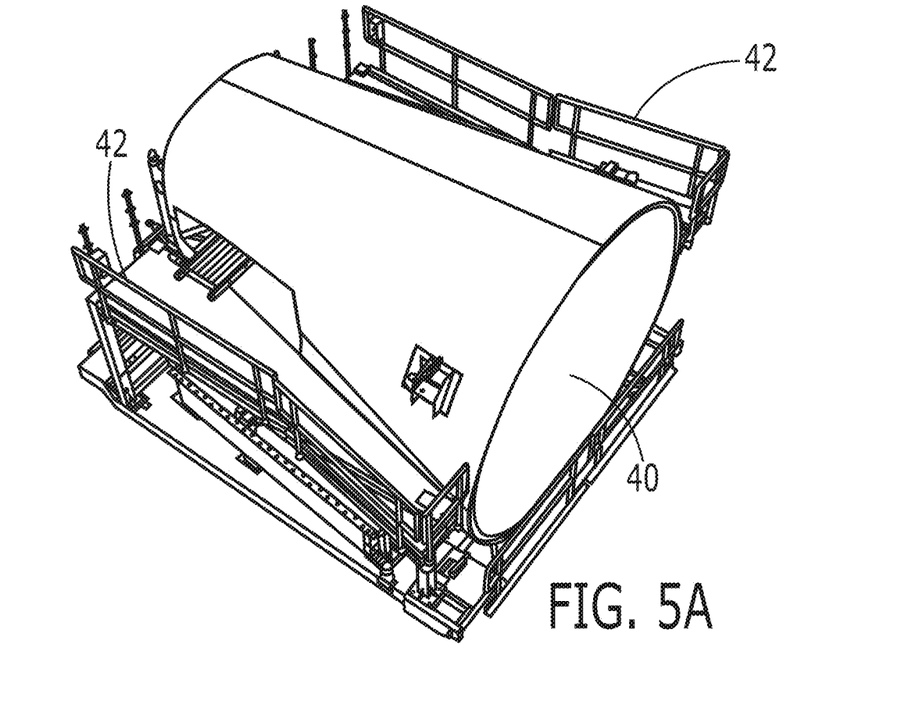
FIGS. 5A, 5B and 5C are computer generated 3D models of the fuselage section of FIG. 3 under different lighting conditions.
Figure 5B:
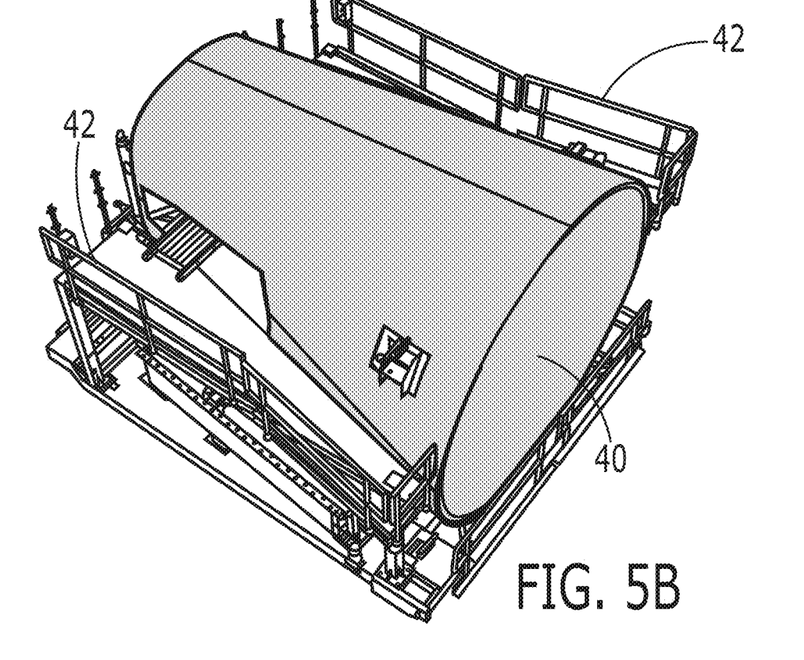
Figure 5C:
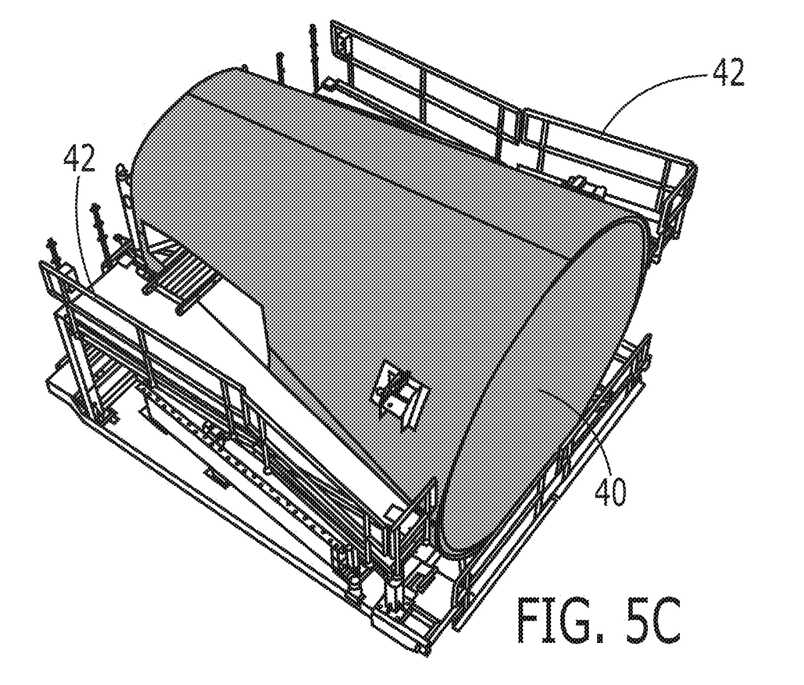

Additionally or alternatively, the plurality of computer generated 3D models may represent the object in a variety of different conditions, such as a plurality of different lighting conditions. By way of example, FIGS. 5A, 5B and 5C depict CAD models of the same fuselage section 40 as shown in FIG. 3. However, the lighting conditions to which the fuselage section is subjected in the CAD models of FIGS. 5A-5C are different. Indeed, the CAD model of FIG. 5B is subjected to less light and is therefore darker than the CAD model of FIG. 5A, while the CAD model of FIG. 5C is subjected to even less light and therefore is even darker than the CAD model of both FIGS. 5A and 5B. As will be noted, the fuselage section of FIGS. 5A-5C are in the same position with only the lighting conditions being varied. In other example embodiments, a different condition may be varied, a plurality of conditions (or different combinations of conditions) may be varied and/or the object may be differently positioned in the different computer generated 3D models.

By way of another example, the plurality of the computer generated 3D models represent the object with different combinations of items positioned about the object. With reference to the CAD model of FIG. 3, the computing device 10, such as the processing circuitry 12, may be configured to generate a plurality of computer generated 3D models representing the fuselage section 40 with different combinations of scaffolding, tooling, fixtures or equipment 42 positioned about the fuselage section. For example, one computer generated 3D model may depict only the fuselage section, another computer generated 3D model may depict scaffolding positioned on all sides of the fuselage section so as to partially occlude the fuselage section, while another computer generated 3D model may depict the fuselage section with the scaffolding that appears in front of the object in FIG. 3 having been removed.

As shown in block 32 of FIG. 2, the computing device 10, such as the processing circuitry 12, is also configured to generate realistic synthetic image data representative of each of the plurality of computer generated 3D models. In this regard, the computing device, such as the processing circuitry, is configured to separately generate realistic synthetic image data for each computer generated 3D model such that a separate realistic synthetic image data set is generated for each respective computer generated 3D model. In an example embodiment, the computing device includes a first machine learning model 18 that is trained to generate realistic synthetic image data from a computer generated 3D model. The first machine learning model may be any of a variety of different types of machine learning models including one or more generative adversarial networks or a combination of an encoder and a decoder, both of which employ respective artificial intelligence algorithms, As shown in FIG. 1, the processing circuitry may be configured to include the first machine learning model. Alternatively, the first machine learning model may be external to, but in communication with the processing circuitry.

With respect to the operation of the first machine learning model 18, the first machine learning model is trained with pairs of computer generated synthetic image data and real image data of the object so as to transfer the visual style of a first domain represented by the real image data to a second domain represented by the synthetic image data. By training the first machine learning model with pairs of synthetic image data and real image data of the object, the first machine learning model may be trained to generate realistic synthetic image data that provides the same or substantially similar appearance to a real image of an object in response to the provision of a computer generated 3D model of the object to the first machine learning model.

Figure 6:
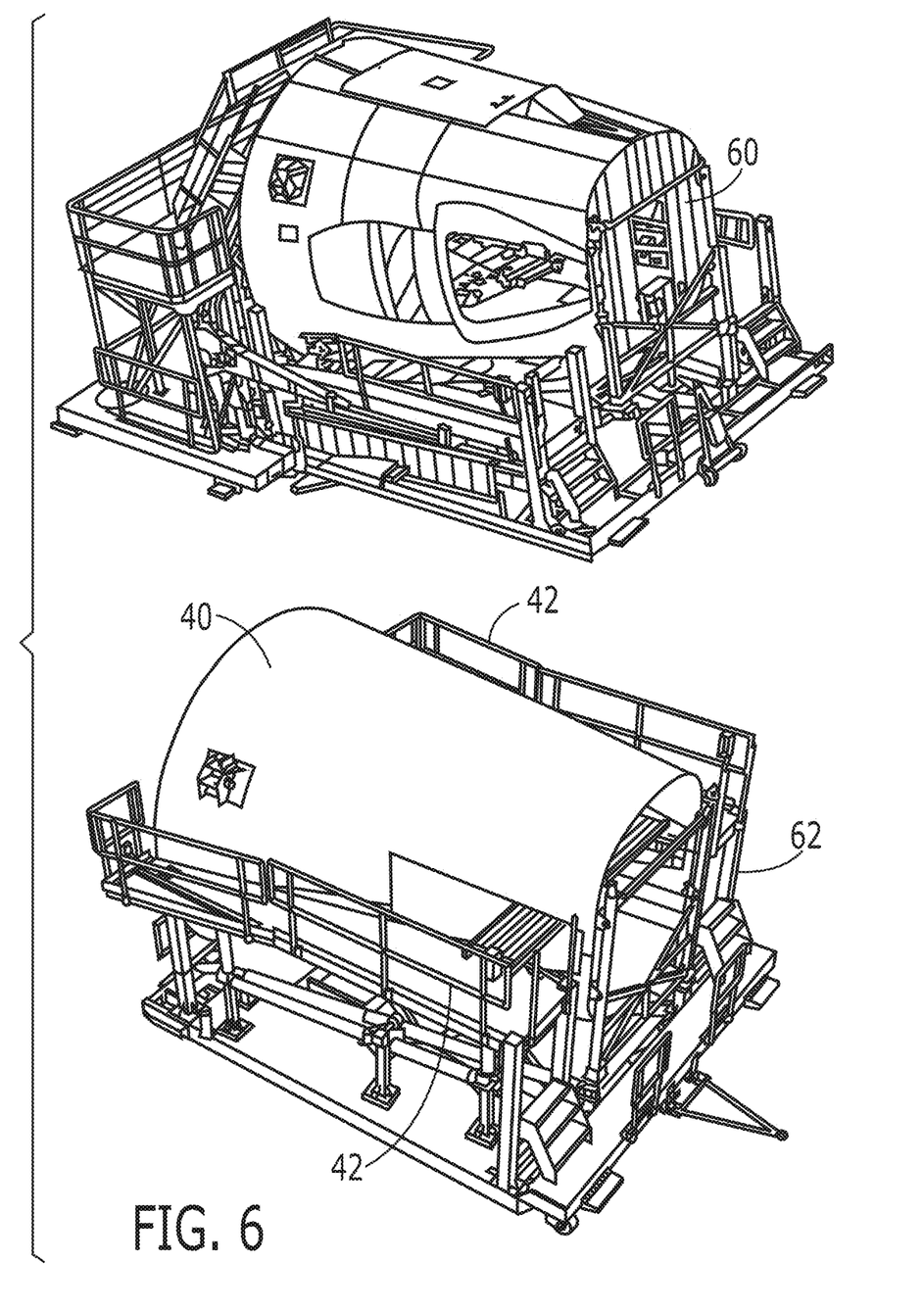
FIG. 6 illustrates a computer generated 3D model of an object and an aligned real image of the same object that are utilized to train a first machine learning model to generate realistic synthetic image data of the object in accordance with an example embodiment.

By way of example, FIG. 6 depicts one pair of real image data 60, such as a real image and synthetic image data 62 of the object represented by the real image data. In this embodiment, not only do the real image data and the synthetic image data depict the same object, but the real image data and the synthetic image data are aligned in that the relative position of the object in the synthetic image data is aligned with the object in the real image data. Moreover, the computer generated 3D model and the real image depict the same object and under the same conditions, including under the same lighting conditions. The synthetic image data therefore is similar in content to the real image data, but is computer generated, as opposed to being a real image of the object. While a single pair of synthetic image data and real image of the object is depicted in FIG. 6, the first machine learning model 18 would be trained with a plurality of pairs of synthetic image data and real image data of the object with the real image data, such as an image of the object, being provided to the first machine learning model in order to generate synthetic image data and feedback then being provided to the first machine learning model as to similarities and differences between the synthetic image data and the real image data of the object to improve the performance of the first machine learning model in terms of generating realistic synthetic image data that mirrors the real image data of the object.

Figure 7:
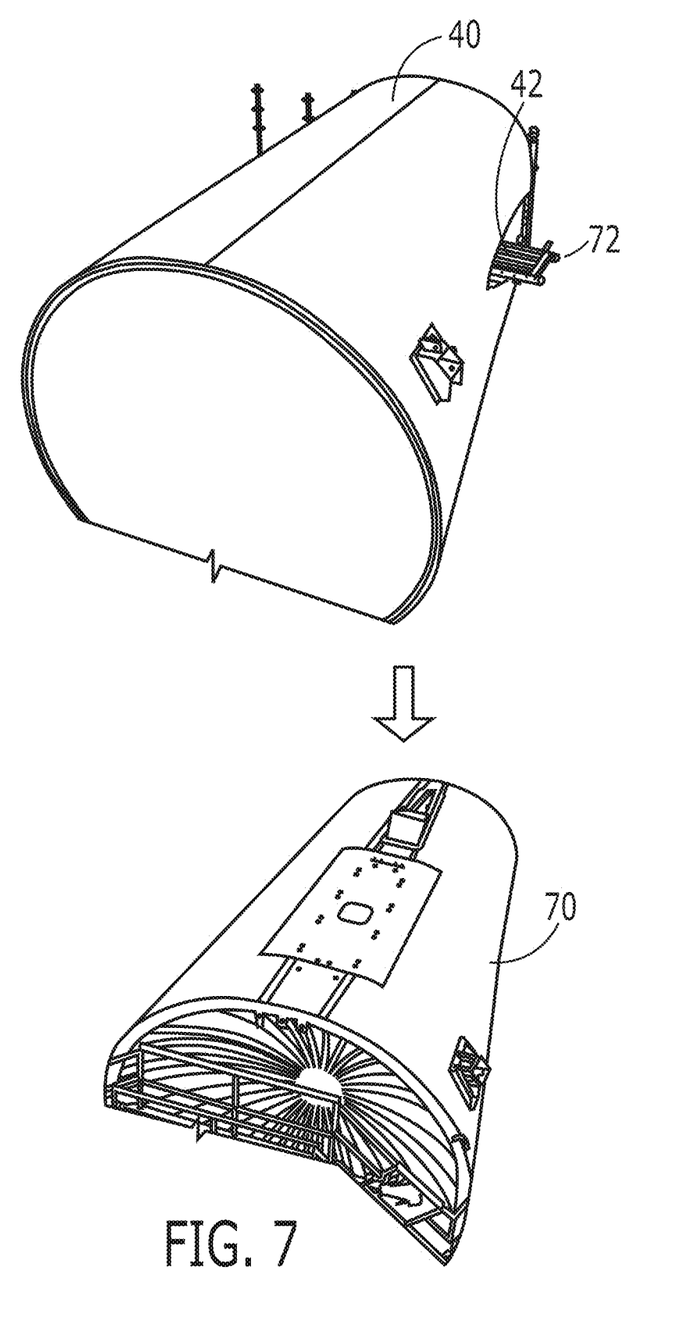
FIG. 7 illustrates a computer generated 3D model of an object and the realistic synthetic image data of the same object that is generated by the first machine learning model in accordance with an example embodiment.

After having trained the first machine learning model 18, a computer generated 3D model of the object may be provided to the first machine learning model with the first machine learning model generating realistic synthetic image data representative of the object that is the subject of the computer generated 3D model with the appearance of the realistic synthetic image data mimicking that of a real image of the object. As with the pairs of computer generated synthetic image data and the real image data of the object with which the first machine learning model is trained, the realistic synthetic image data that is generated by the first machine learning model is representative of the same object as depicted by the computer generated 3D model and is in the same position and subject to the same conditions, such as the same lighting conditions. One example of the realistic synthetic image data 70 generated from a computer generated 3D model 72 of a fuselage section 40 is depicted in FIG. 7 with the generation of the realistic synthetic data being provided by the first machine learning model that has been trained with pairs of computer generated synthetic data and real image data of the fuselage section including, for example, the pair of computer generated synthetic data 62 and the real image data 62 of the fuselage section depicted in FIG. 6.

As shown in block 34 of FIG. 2, the computing device 10, such as the processing circuitry 12, of an example embodiment may also be configured to automatically label the realistic synthetic image data based upon the corresponding labels of the computer generated 3D model of which the realistic synthetic image data is representative. In this regard, the computer generated 3D model may include a plurality of labels designating, for example, various components of the object and other features of the object, such as the dimensions, angles, etc. As the realistic synthetic image data is generated by the first machine learning model 18 from the computer generated 3D model, the corresponding components and features of the object represented by the realistic synthetic image data may be automatically and similarly labeled based upon the labels of the computer generated 3D model. As a result, the realistic synthetic image data representative of the object may be efficiently labeled in an automated manner.

As shown in block 36 of FIG. 2, the computing device 10, such as the processing circuitry 12, of an example embodiment is also configured to train, test or deploy a computer vision model 20 to recognize the object from an image based upon the realistic synthetic image data that has generated from the plurality of the computer generated 3D models. In this regard, the computing device, such as the processing circuitry, may be configured to efficiently generate a plurality of realistic synthetic image data sets representative of different configurations of the object, such as realistic synthetic image data sets representative of the object in different positions, under different conditions, such as in different lighting conditions and/or with different features proximate the object including, in some embodiments, features that at least partially occlude the object, etc. As described below, the realistic synthetic image data sets may include one or more realistic synthetic image data sets representative of the object with one or more physical modifications, such as a visual anomaly including, for example, manufacturing nonconformances. In some environments, the realistic synthetic image data that is generated may also be automatically labeled based upon corresponding levels of the computer generated 3D model of which the realistic synthetic image data is representative.

As a result, the plurality of realistic synthetic image data sets that have been generated and that are representative of the object may be utilized as training images to train the computer vision model in order to identify or detect the object from a real image that depicts the object. By utilizing the plurality of realistic synthetic image data sets, a substantial number of training images may be created in an efficient manner and the computer vision model may be fully trained in an efficient manner such that the accuracy and consistency with which the computer vision model thereafter identifies the object from a real image are enhanced.

The computer vision model 20 may be embodied by the computing device 10 or may be external to the computing device, but in communication therewith. In an embodiment in which the computing device embodies the computer vision model, the processing circuitry 12 may embody the computer vision model or the computer vision model may be external to the processor, but in communication therewith. The computer vision model may include any of various models including, for example, a machine learning model, a deep learning model and/or a rule-based computer vision model.

In an example embodiment in which the computing device 10 includes the computer vision model 20 that has been trained and tested utilizing the realistic synthetic image data, the computing device, such as the processing circuitry 12, the computer vision model or the like, may be configured to be deployed to detect the object from a real image. As such, a real image that has been captured by a camera or other image capture device and that is provided to the computing device, such as via the communication interface 16, may be analyzed by the computer vision model to identify the object, if any, depicted by the image. In the course of detecting the object from a real image, the computing device of an example embodiment, such as the processing circuitry, is configured to transfer a localization coordinate system associated with the object that has been detected from a real image coordinate system as defined by the image to a Cartesian coordinate system.

Figure 8:
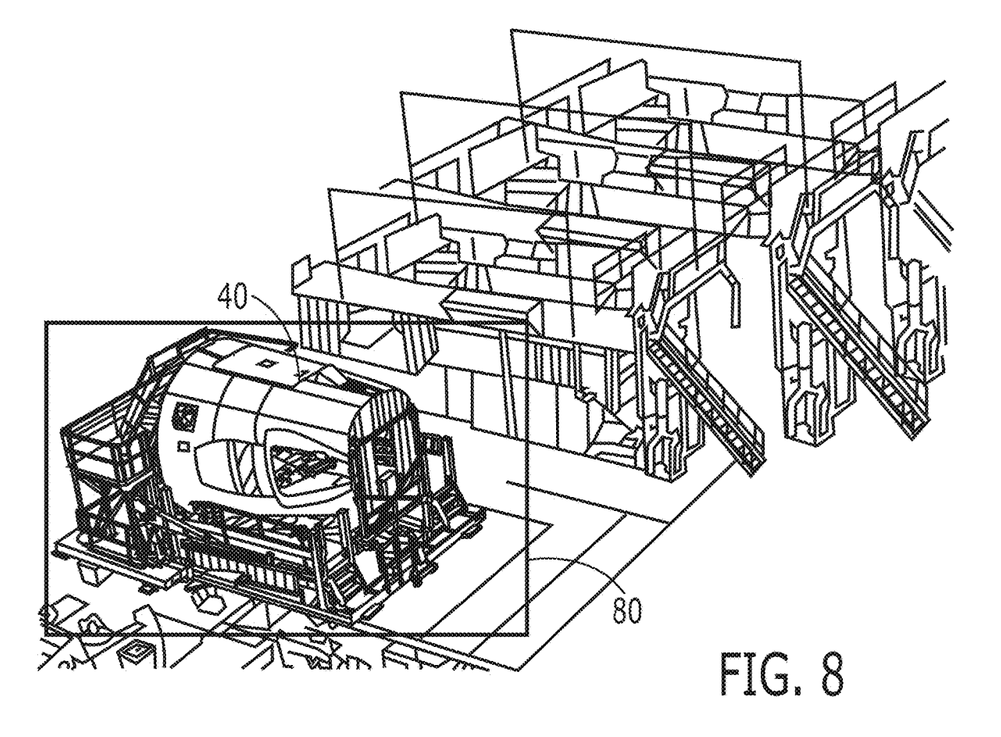
FIG. 8 illustrates the detection of a fuselage section within a manufacturing facility and the demarcation of the fuselage section with a bounding box in accordance with an example embodiment.

By way of example, FIG. 8 depicts a portion of a manufacturing facility in which at least a portion of an aircraft including a fuselage section is manufactured. The computing device 10, such as the processing circuitry 12, of this example embodiment is configured to deploy or utilize the computer vision model 20 to identify the object, such as fuselage section 40, from an image. As depicted in FIG. 8, the image has been captured by a camera, such as a security camera, within the manufacturing facility. In an example embodiment, the computing device, such as the processing circuitry, is configured to detect, classify and/or localize the object. For example, the computing device, such as the processing circuitry, may be configured to define a bounding box 80 containing the object within the image. FIG. 8 depicts an example of a bounding box that is defined so as to surround the object, such as the fuselage section, that has been identified by the second machine learning model.

Based upon the automatic labeling of the realistic synthetic data, the computing device 10, such as the processing circuitry 12 and, more particularly, the computer vision model 20, may also be configured to label the image in which the object is detected, so as to label the object, components of the object and/or features of the objects, such as dimensions, angles, etc. that correspond to similarly labeled components, features, etc. of the realistic synthetic data.

While the computing device 10, method and computer program product of an example embodiment may be configured to generate and utilize realistic synthetic image data to identify an object in its entirety as described above, the computing device, method and computer program product of an example embodiment may be configured to identify an object having a particular characteristic, such as an object having a visual anomaly. Different types of objects may have different types of visual anomalies that may be identified by the computing device, method, and computer program product. In the example described above in which the object is a fuselage section 40, visual anomalies that may be identified include inward dents, outward dents, depressions, bulges, fasteners extending outward from the aircraft skin, fasteners inset into the aircraft skin and/or other features resulting from manufacturing non-conformance.

Figure 9:
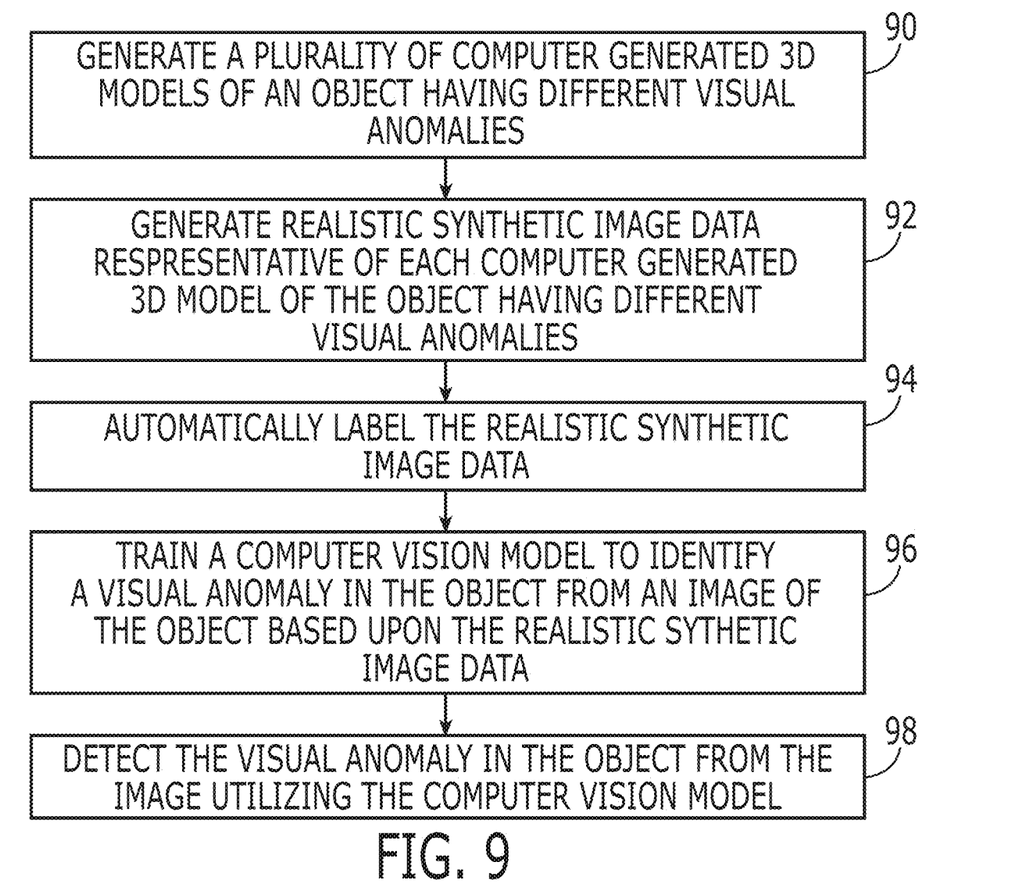
FIG. 9 is a flowchart of the operations performed, such as by the computing device of FIG. 1, to generate and utilize realistic synthetic image data, such as to train a computer vision model to identify a visual anomaly in an object from an image, in accordance with another example embodiment.

In this example embodiment depicted, for example, in FIG. 9, the computing device 10, such as the processing circuitry 12, is configured to generate a plurality of 3D models of an object that represent the object having different visual anomalies. As such, 3D models, such as CAD models, may be generated of the object without a visual anomaly, while other 3D models may be generated to represent the same object in the same position and under the same conditions, but with one or more predefined visual anomalies. See block 90 of FIG. 9. In this example embodiment, the computing device, such as the processing circuitry, is also configured to generate realistic synthetic image data representative of each of the plurality of the computer generated 3D models of the object with different visual anomalies. See block 92. As described above, the generation of the realistic synthetic image data utilizes a first machine learning model 18 that has been trained with pairs of computer generated synthetic image data representing the object with different visual anomalies and real image data of the object with the same visual anomalies with a computer generated synthetic image data and the corresponding real image data being aligned, that is, with the relative position of the object in the synthetic image data being aligned with the object in the real image data. As a result, the first machine learning model is configured to transfer the visual style of a first domain represented by the real image data to a second domain represented by the realistic synthetic image data.

As described above, the computing device 10, such as the processing circuitry 12 and/or the first learning model 18, may also be configured to automatically label the realistic synthetic image data based upon the labels of the corresponding computer generated 3D model from which the realistic synthetic image data is generated. See block 94. Among other features, the labels may identify the visual anomaly that appears in the computer generated 3D model and in the corresponding realistic synthetic image data.

As shown in block 96 of FIG. 9, the computing device 10, such as the processing circuitry 12, is also configured a train a computer vision model 20 to identify a visual anomaly in the object from an image of the object based upon the realistic synthetic image data generated for the plurality of computer generated 3D models. Thus, the plurality of realistic synthetic image data sets representative of the object with different visual anomalies, such as different types of visual anomalies, visual anomalies at different locations and/or visual anomalies under different conditions, such as different lighting conditions, are utilized to train the computer vision model such that upon receipt of a real image of an object having a visual anomaly, the computer vision model will be able to identify the visual anomaly. As such, the computing device, such as the processing circuitry, of an example embodiment is also configured to detect the visual anomaly in the object from an image of the object utilizing the computer vision model that has been trained utilizing the realistic synthetic image data. See block 98.

In this regard, not only may the object be identified from an image, but a visual anomaly present in the object as represented by the image may be accurately and reliably identified by the computer vision model 20 that has been efficiently trained utilizing the realistic synthetic image data. By reliably identifying the visual anomaly from an image of the object, the visual anomaly may be addressed at an earlier stage, such as an earlier stage in the manufacturing process, which may allow the visual anomaly to be addressed in a more efficient and cost effective manner. Moreover, by identifying the visual anomaly in an automated and reliable manner utilizing the computer vision model that has been trained with a plurality of realistic synthetic image data sets, appropriate action may be taken with respect to the object having the visual anomaly prior to further assembly involving the object. By way of example, an inward dent in the fuselage section 40 may be identified utilizing the computer vision model and the fuselage section may then be appropriately repaired so as to eliminate the dent prior to assembly of the fuselage section with other fuselage sections of the aircraft. Thus, the computing device 10, method and computer program product of an example embodiment may increase the efficiency of the overall process that includes the object, such as a manufacturing process that includes the object.

As described above, FIGS. 2 and 9 are flowcharts illustrating the operations performed by a computing device 10, method, and computer program product to generate and utilize realistic synthetic image data to train, test and/or deploy a computer vision model which, in turn, may be configured to detect an object or a visual anomaly in an object. It will be understood that each block of the flowcharts, and combinations of blocks in the flowcharts, may be implemented by various means, such as hardware, firmware, processing circuitry 12, and/or other devices associated with execution of software including one or more computer program instructions. For example, one or more of the procedures described above may be embodied by computer program instructions. In this regard, the computer program instructions which embody the procedures described above may be stored by the memory device 14 of the computing device and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    generating a plurality of computer generated three-dimensional (3D) models of an object, wherein the plurality of computer generated 3D models represent the object in different positions having different visual anomalies, wherein the different visual anomalies comprise manufacturing non-conformances;
    generating realistic synthetic image data representative of each of the plurality of computer generated 3D models, wherein generating the realistic synthetic image data comprises utilizing a first machine learning model trained with pairs of computer generated synthetic image data and real image data of the object to transfer visual style of a first domain represented by the real image data to a second domain represented by the synthetic image data, and parametrically modifying a geometry of the 3D models to represent different configurations of the object including at least one physical modification of the object to reflect manufacturing non-conformances of the object; and
    training, testing or deploying a computer vision model to recognize the different visual anomalies of the object from an image based upon the realistic synthetic image data that has been generated.

2. The method according to claim 1 further comprising detecting the object from the image utilizing the computer vision model trained utilizing the realistic synthetic image data.

3. The method according to claim 2 wherein detecting the object comprises at least one of detecting, classifying or localizing the object within the image.

4. The method according to claim 2 wherein detecting the object comprises transferring a localization coordinate system associated with the object that has been detected from a real image coordinate system as defined by the image to a Cartesian coordinate system.

5. The method according to claim 1 wherein the plurality of computer generated 3D models represent the object in different lighting conditions.

6. The method according to claim 1 further comprising training the first machine learning model utilizing the pairs of synthetic image data and the real image data of the object, wherein a relative position of the object in the synthetic image data is aligned with the object in the real image data.

7. The method according to claim 1 further comprising automatically labeling the realistic synthetic image data based upon corresponding labels of the computer generated 3D model of which the realistic synthetic image data is representative.

8. The method according to claim 1, wherein the different visual anomalies comprise one or more of inward dents, outward dents, depressions, bulges, fasteners extending outward from an aircraft skin, and fasteners inset into an aircraft skin.

9. A computing device comprising processing circuitry configured to:
   generate a plurality of computer generated three-dimensional (3D) models of an object, wherein the plurality of computer generated 3D models represent the object in different positions having different visual anomalies, wherein the different visual anomalies comprise manufacturing non-conformances,
   wherein the processing circuitry comprises a first machine learning model configured to generate realistic synthetic image data representative of each of the plurality of computer generated 3D models, wherein the first machine learning model is trained with pairs of computer generated synthetic image data and real image data of the object to transfer visual style of a first domain represented by the real image data to a second domain represented by the synthetic image data, and to parametrically modify a geometry of the 3D models to represent different configurations of the object including at least one physical modification of the object to reflect manufacturing non-conformances of the object, and
   wherein the processing circuitry is configured to train, test or deploy a computer vision model to recognize the different visual anomalies of the object from an image based upon the realistic synthetic image data that has been generated.

10. The computing device according to claim 9 wherein the processing circuitry is further configured to detect the object from the image utilizing the computer vision model trained utilizing the realistic synthetic image data.

11. The computing device according to claim 9 wherein the plurality of computer generated 3D models represent the object in different lighting conditions.

12. The computing device according to claim 9 wherein the first machine learning model is trained utilizing the pairs of synthetic image data and the real image data of the object, wherein a relative position of the object in the synthetic image data is aligned with the object in the real image data.

13. The computing device according to claim 9 wherein the processing circuitry is further configured to automatically label the realistic synthetic image data based upon corresponding labels of the computer generated 3D model of which the realistic synthetic image data is representative.

14. The computing device according to claim 9, wherein the different visual anomalies comprise one or more of inward dents, outward dents, depressions, bulges, fasteners extending outward from an aircraft skin, and fasteners inset into an aircraft skin.

15. A method comprising:
   generating a plurality of computer generated three-dimensional (3D) models of an object, wherein the plurality of computer generated 3D models represent the object having different visual anomalies, wherein the different visual anomalies comprise manufacturing non-conformances;
   generating realistic synthetic image data representative of each of the plurality of computer generated 3D models of the object with different visual anomalies, wherein generating the realistic synthetic image data comprises utilizing a first machine learning model trained with pairs of computer generated synthetic image data and real image data of the object to transfer visual style of a first domain represented by the real image data to a second domain represented by the synthetic image data, and parametrically modifying a geometry of the 3D models to represent different configurations of the object including at least one physical modification of the object to reflect manufacturing non-conformances of the object; and
   training, testing or deploying a computer vision model to identify a visual anomaly in the object from an image of the object based upon the realistic synthetic image data that has been generated.

16. The method according to claim 15 further comprising detecting the visual anomaly in the object from the image of the object utilizing the computer vision model trained utilizing the realistic synthetic image data.

17. The method according to claim 15 further comprising training the first machine learning model utilizing the pairs of synthetic image data and real image data of the object, wherein a relative position of the object in the synthetic image data is aligned with the object in the real image data.

18. The method according to claim 15 wherein the plurality of computer generated 3D models represent the object in different lighting conditions.

19. The method according to claim 15 wherein the plurality of computer generated 3D models represent the object in different positions.

20. The method according to claim 15 further comprising automatically labeling the realistic synthetic image data based upon corresponding labels of the computer generated 3D model of which the realistic synthetic image data is representative.

* * * * *